US007280647B2

(12) United States Patent
Henderson (10) Patent No.: US 7,280,647 B2
(45) Date of Patent: Oct. 9, 2007

(54) DYNAMIC PHOTO CALLER IDENTIFICATION

(75) Inventor: Samuel Henderson, Port Arthur, TX (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 10/635,921

(22) Filed: Aug. 7, 2003

(65) Prior Publication Data

US 2005/0031106 A1     Feb. 10, 2005

(51) Int. Cl.
*H04M 1/56* (2006.01)
*H04M 15/06* (2006.01)
*H04M 11/00* (2006.01)
*H04M 3/42* (2006.01)

(52) U.S. Cl. .............................. 379/142.01; 379/93.23; 455/415

(58) Field of Classification Search .. 379/88.19–88.21, 379/93.23, 142.01, 142.04, 142.07, 142.1, 379/142.12, 142.15, 142.17; 455/415–416
See application file for complete search history.

(56) References Cited

U.S. PATENT DOCUMENTS

| | | | |
|---|---|---|---|
| 5,864,612 | A | 1/1999 | Strauss et al. |
| 5,889,852 | A * | 3/1999 | Rosecrans et al. ..... 379/355.05 |
| 6,343,120 | B1 | 1/2002 | Rhodes |
| 6,442,263 | B1 * | 8/2002 | Beaton et al. ......... 379/142.04 |
| 6,826,270 | B1 | 11/2004 | Welch et al. |
| 6,873,861 | B2 * | 3/2005 | Awada et al. ................ 455/566 |
| 6,909,910 | B2 * | 6/2005 | Pappalardo et al. ........ 455/558 |
| 6,970,543 | B2 * | 11/2005 | Lautenschlager et al. ..................... 379/142.04 |
| 7,013,131 | B2 * | 3/2006 | Lee et al. .................... 455/415 |
| 2002/0052921 | A1 * | 5/2002 | Morkel ........................ 709/206 |
| 2003/0043974 | A1 * | 3/2003 | Emerson, III ............ 379/88.13 |
| 2003/0083086 | A1 * | 5/2003 | Toyryla et al. ............. 455/518 |
| 2004/0066920 | A1 * | 4/2004 | Vandermeijden .......... 379/88.19 |
| 2004/0208301 | A1 * | 10/2004 | Urban et al. ........... 379/142.17 |
| 2006/0282450 | A1 * | 12/2006 | Barnes ........................ 707/101 |

FOREIGN PATENT DOCUMENTS

| | | |
|---|---|---|
| EP | 0 802 661 A2 | 10/1997 |
| EP | 1 282 319 A2 | 2/2003 |
| WO | 01/19059 A1 | 3/2001 |
| WO | 01/54441 A1 | 7/2001 |
| WO | 02/17602 A1 | 2/2002 |
| WO | 03/015380 A1 | 2/2003 |
| WO | 2005/022879 A1 | 3/2005 |

* cited by examiner

*Primary Examiner*—Quoc Tran
(74) *Attorney, Agent, or Firm*—Banner & Witcoff, Ltd.

(57) ABSTRACT

A method for implementing self-chosen caller identification and instantaneous transmission of caller identification information before communications have been established is described. Aspects of the invention improve upon modem methods and bridge the gap between current technology that allows users to self-identify in communicating with other users and technology that transmits this information before a telephone call is answered. Furthermore, aspects of the invention allow a user to select his or her own identifying information (e.g., picture, ring tone, video) and send it to contacts in his or her contact database. A background transmission process transmits the identifying information upon selection, creating a fast and seamless method of self-identification for caller ID technology. The identifying information may be stored in an association database using factors such as events and identification type. An option may also exist that allows users to override any caller identification information transmitted to them.

34 Claims, 5 Drawing Sheets

DYNAMIC PHOTO CALLER IDENTIFICATION

FIELD OF THE INVENTION

Aspects of the invention relate generally to telephone caller identification and information delivery. More specifically, aspects of the invention relate to a method that can be used to deliver selected identification information from one user to another user before communication has been established.

BACKGROUND OF THE INVENTION

Since the invention of the telephone, voice communication has evolved to become an integral part of people's business, social and personal lives. Voice communications provides immediacy in being able to link two parties almost instantaneously and reliability in knowing that called party is receiving and understanding the message. As effective and productive as the telephone has become, it has also exposed an avenue for those that are commercially inclined to exploit its ubiquitous nature. Telemarketers and other marketing/advertising entities use the telephone and voice communications to peddle any and all products to unsuspecting individuals. Further, users like to screen calls to not be bothered by wrong numbers. Such problems have given rise to what is known as caller identification (caller ID).

Caller ID shows called parties the identity and any attributes associated with the identity of those that are calling (hereinafter referred to as "calling parties"). Current caller ID technologies include mobile telephone applications where called parties may designate a particular identifier for a particular phone number. Mobile phone and caller ID technologies have advanced such that identifiers may now include ring tones and images. For example, individual A with telephone number 123-345-6789 calls individual B. Before B picks up the phone, the name, ring tone or image that B has associated with the phone number 123-345-6789 is displayed on B's caller ID screen. Thus, B may choose to either answer or ignore the call. The unfortunate compromise involved in such a technology is that the calling party is denied the freedom to specify his or her own identifier. Therefore, party A would have no control over what image or name or ring tone is associated with his identity when calling another person.

In another field, instant messaging systems show an identifying image when conversing with another party. Here, a messaging party may choose his or her own identifier. For example, in an instant messaging system, party A sets his identifying image as a gavel and transmits an instant message to party B. B receives the message from A and, after a delay caused by the image transmission process, eventually receives the gavel image identifying A. After receiving the identifying image, the messaged party B will retain and associate that image with party A, eliminating the need to transfer the image every time the messaging party A initiates a conversation. However, each time a messaging party A decides to change the image, the delay will repeat as the new image needs to be transmitted and saved in the messaged party's (B's) database. Further, a message needs to be transmitted prior to any updates of a messaging party's image. Therefore, while the instant messaging identification method provides a solution for self-identification, it has not achieved the immediate nature of identification evident in telephone caller ID systems.

A technology that can combine the benefits of self-identification with the immediacy of caller identification results is needed that improves the capabilities of telephones (or telephone systems) and messengers while preserving the freedom of self-identification.

BRIEF SUMMARY

Aspects of the invention presented herein bridge the gap between current identification technologies to empower calling parties to define his or herself while maintaining the immediacy of identification to preserve the purpose of caller ID. Aspects of the invention allow users to define their own identities. In some aspects, a user can select his or her own identifier, automatically transmit it to a set of applicable users, and store all associated files or aspects of the identifying information in the receiver's database.

These and other objects and features of the invention will be apparent upon consideration of the following detailed description thereof, presented in connection with the following drawings in which like reference numerals identify the elements throughout.

BRIEF DESCRIPTION OF THE DRAWINGS

A more complete understanding of the various aspects of the present invention and the advantages thereof may be acquired by referring to the following description in consideration of the accompanying drawings, in which like reference numbers indicate like features, and wherein.

DETAILED DESCRIPTION

Aspects of the invention relate to providing calling parties a greater flexibility to identify themselves to others Multiple people sharing one telephone could change the image or ring tone or sound associations before calling another party and be identified correctly by the called party. Furthermore, those receiving calls would not need to wait until after initiating a conversation to discover the caller's identity. Such a technology would protect society's privacy while maintaining an individual's right to help define his or her own identity.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. Various aspects of the invention, a computer and a telephone communication systems, are described.

Computer Systems

Figure 1:
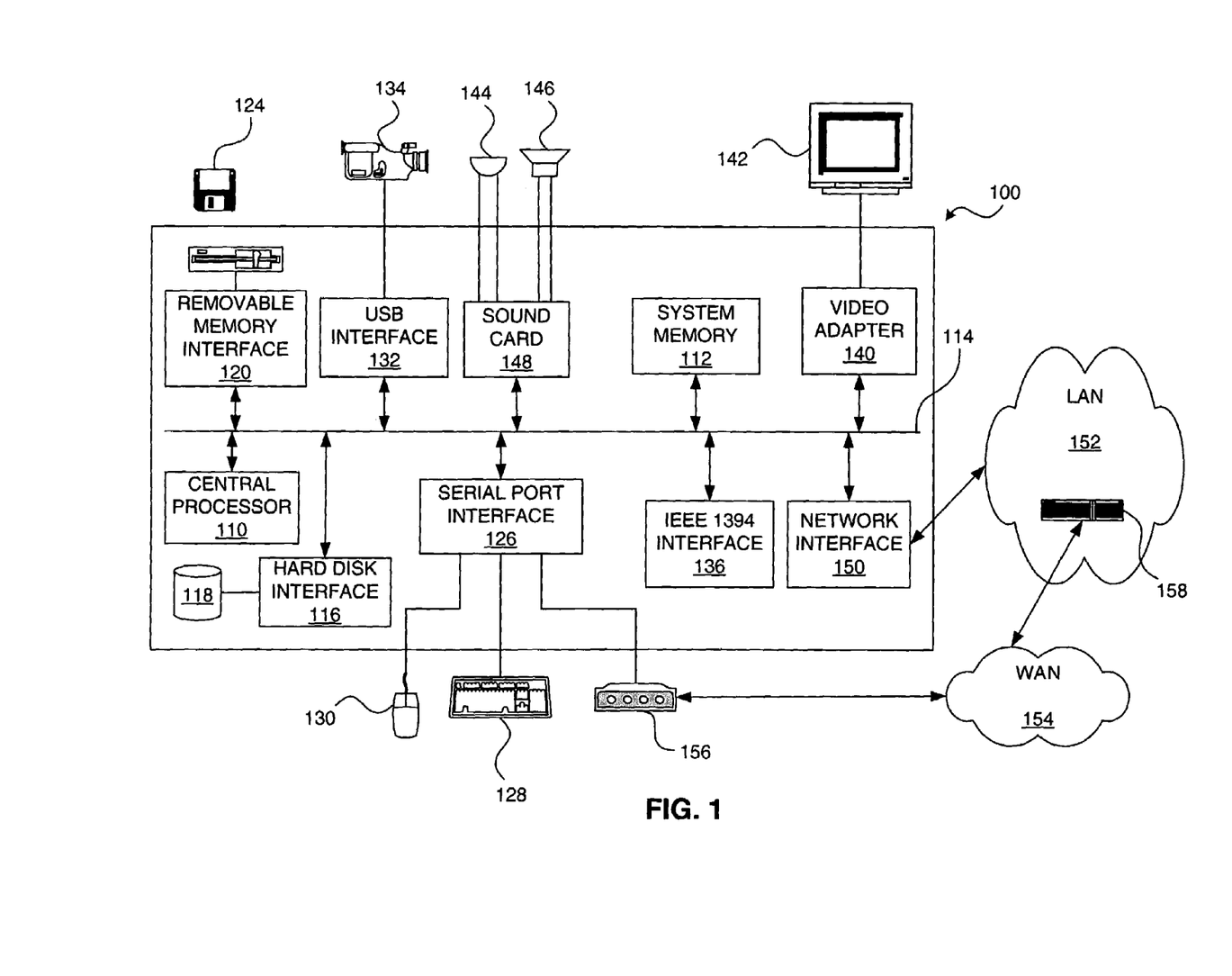
FIG. 1 illustrates a block diagram of a computer that may be used to implement one or more aspects of the invention.

One or more aspects of the invention may be embodied in one or more computers and computer systems, such as is illustrated in FIG. 1. In FIG. 1, computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive a 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 1 a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may be configured to operate with particular manufacturer interfaces such as FireWire developed by Apple Computer and i.Link developed by Sony. Input devices may also be coupled to system bus 114 through a parallel port, a game port, a PCI board or any other interface used to couple an input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 146. A sound card 128 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, may also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, libraries, etc. that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants, mobile telephones and the like. Furthermore, the invention may also be practiced in distributed computing environments where tasks are performed by remote processing devices that are linked through a wireless or wired communications network. In a distributed computing environment, program modules may be located in both local and remote memory storage devices.

The inventive methods may be embodied as computer readable instructions stored on a computer readable medium such as a floppy disk, CD-ROM, removable storage device, hard disk, system memory, embedded memory or other data storage medium. The computer readable medium stores computer executable components, or software modules. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

Telephone Systems

Figure 2:
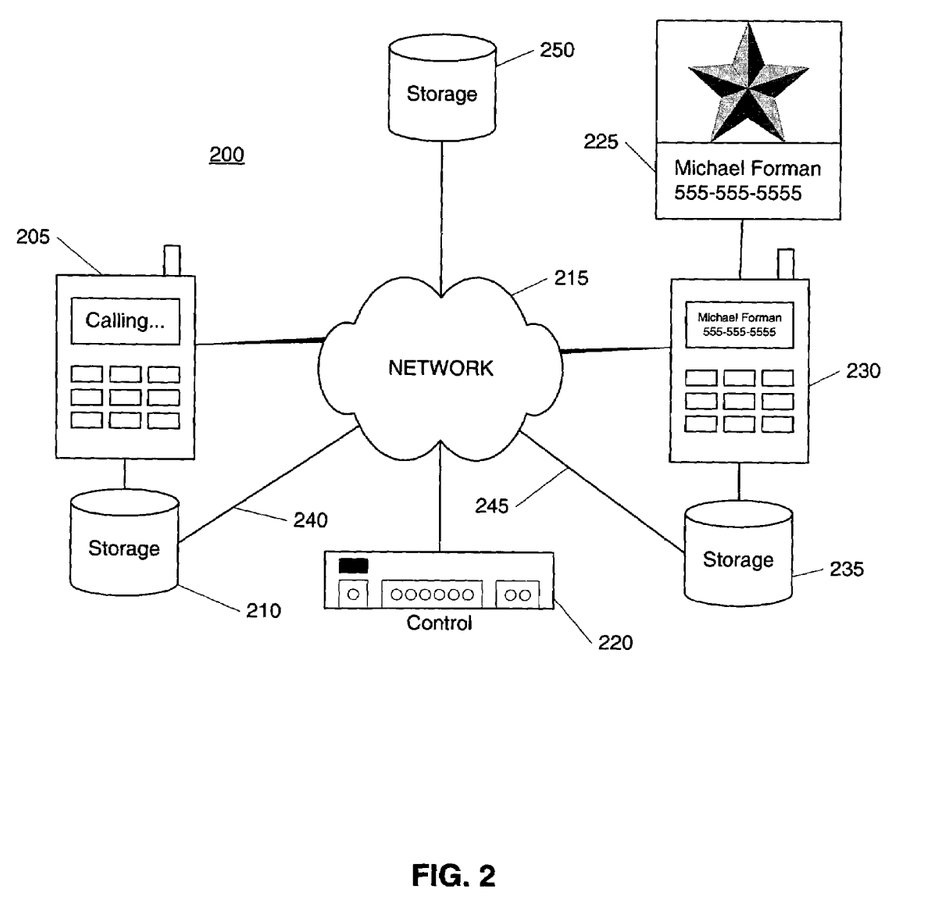
FIG. 2 illustrates one aspect of the invention as applied to a plurality of telephones or telephone systems.

FIG. 2 illustrates aspects of the invention as applied to a plurality of telephones or telephone systems using wired and/or wireless connections. Generally, a telephone system 200 may include a telephone client 205, a client storage database 210, an audio-visual display 225, a network 215 and at least one control system 220 for assisting the routing of telephone calls placed through the network 215. The telephone client 205 is primarily responsible for making and receiving calls. In one example, all information that is sent from the network 215 to a user passes through the telephone client 205. While the network 215 may maintain its own database 250, each telephone client may also have its own internal storage 210. The storage 210 may store frequently dialed numbers, saving special ring tones, recording caller information and maintaining speed dial association tables.

The internal storage 210 further provides users the freedom to use the telephone network system 200 with a sense of individuality and freedom. While the telephone client 205 may be directly linked to the telephone network 215, the client's internal storage 210 may also maintain a link with the network 215 and other telephone clients 230. The separate link 240 for the storage facility 210 is advantageous for background communications processes that do not require the user's attention or control. This advantageously offers greater flexibility and efficiency in transmitting data over a telephone network system 200.

The network 215 generally includes a control 220 and a database 250. When a call is made from a client 205, the control 220 may initially receive the signal and subsequently route the telephone call to the correct network link. The control 220 may also maintain network traffic and find alternate routes to reduce load on certain network paths as it sees fit. The network database 250 may maintain a record of all telephone numbers and a routing table to instruct the control 220 where to send incoming calls. Various telephone systems that may be used include POTS, VOIP, DNS and others.

Caller Identification

The network database 250 may further include identifying information for each phone number. For example, a phone number 555-555-5555 may be registered to "Michael Forman" Upon receiving a call, the network 215 may automatically call to the control 220, which may then refer to the database 250 for further instructions and information. After resolving the proper network paths, the network 215 may then send the call and any identifying information retrieved from the database 250 to the recipient client 230. The telephone client at the call destination 230, having received the call information, may then refer to its own internal storage 235 or other storage to replace any identifying information. For example, the telephone network database 250 may have stored the phone number 444-555-3245 with the name "Michael Forman," but in the internal memory 235 of the receiving telephone client 230, the number has been stored as "Mike F." Therefore, when receiving the call, the audio-visual display 225 of the receiving telephone client 230 may show "Mike F." instead.

One of the difficulties of this approach is the calling party has minimal control over how he or she is portrayed. Aspects of the present invention permit the calling user to specify his or her identifying image/name/ring tone/multimedia asset. Instead of or in addition to an identifying name, a unique ring tone or specific image could identify the calling party. The calling client-side storage 210, recognizing a new identifier, may then send the new identifier to the contacts listed in the user's contact database. Therefore, instead of the receiving user choosing the calling user's identifying information, the calling user may override both the network's 250 identification database and the receiver's identification database 235 and display an identifier of his or her own choosing. This method further improves upon current technology by empowering the calling user to identify him or herself in a self-satisfying manner. In another arrangement of the invention, instead of specifying a new name, the user may specify a video identifier. Therefore, in addition to displaying the name, a video may also be shown. Such an improvement increases the user's freedom and flexibility to identify their friends' calls and other incoming communications.

Contact Databases and Association Tables

Figure 3:
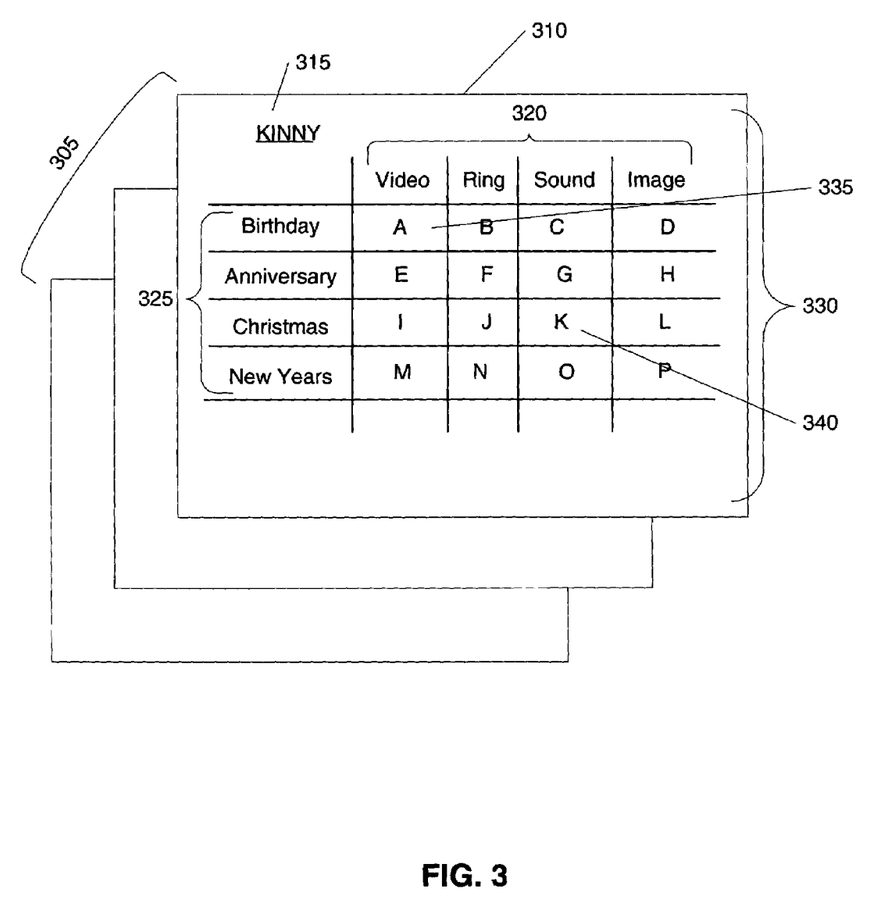
FIG. 3 illustrates a contact database and association table according to embodiments of the invention.

FIG. 3 illustrates a contact database and association table according to some aspects of the invention. As mentioned previously, a telephone client may have a storage facility that stores frequently called contacts and associated data. One method of storing such information and corresponding identifiers is through an association table 330 located within the contact database 305. In some aspects, a contact database entry 310 may exist for each individual contact and therefore an entry 310 would comprise its own association table 330. In other aspects, there may be only one entry that applies to one or more calls. The identifier association table 330 allows callers to specify different identifiers corresponding to different events or days. Some of these events could include birthdays, anniversaries, and holidays such as Christmas and New Years. There may also be a wide selection of different identifiers that may be specified for those events including videos, ring tones, sounds and images. For example, in a user's contact database, there may be an entry for a contact named "Kinny" 315. Within this entry 310, a video may be specified as an identifier A 335 for the contact's birthday. Additionally, a sound identifier K 340 may be associated with the Christmas holiday. Alternatively, one may separately specify dates and times and associate with those dates and times corresponding to ones own identification info. Thus, the method of one embodiment of the invention advantageously allows a user to identify him or herself in a plurality of ways for different instances.

Other methods of constructing an association table include using the incoming phone number as a key value. Because a phone number will generally not fluctuate over moderate periods of time, it may be advantageous to use such an approach. Furthermore, phone numbers are generally stored in a central phone network database, allowing for a static method of determining at least one identifying trait of the caller. Therefore, upon receiving the identifying phone number of the caller, the receiving client may easily retrieve additional identifying information from an association table constructed by phone number key values. While the construction of the contact database may be by phone number, the display method may still be by caller name for familiarity and user-friendliness.

The information in table 325 may be forwarded from the calling party's contact database to the called party's contact database (in FIG. 3, the called party would be "Kinny 315.") The forwarding of the information from table 325 may occur in a variety of ways and at a variety of times. For instance, the information in table 325 may be forwarded to the called party (Kinny 315) when the information in table 325 is modified or some later time (for example, at night or on the weekends when traffic is low). Also the information in table 325 may be transmitted to the called party "Kinny 315" when the called party 315's receiving device (telephone or the like) is connected to a network and receiving information. Alternatively, the information may be temporarily stored prior to being sent to called party 315. This arrangement is beneficial when the calling party wants to forward information from table 325 but the called party 315 is not presently connected to the network. The temporary storage may then later forward information relating to table 325 to the called party 315 when the called party 315 is back on-line.

The calling party may select one or more of the calling attributes (the values in table 325) in a variety of ways. For instance, the calling party may specify the attributes through operation of a telephone interface. Also, one may use information in a personal computer to add or modify attributes, through using a local program or information received from a network. One may also use a personal data assistant (PDA), a device showing web pages (for instance, WebTV by Microsoft Corporation), or any networked device to modify the table 325. The modifications may be made through a proprietary program and interface, an HTML interface, and XML interface or any other interface that permits a user to exchange information with a network. In this regard, any application, browser, or information handling device that can access a network (for instance, the internet) or network 215 or storage 250 may be used to change a calling party's identification.

Further, other applications may include the ability to modify how a calling party is projected to called parties. For instance, one may use an instant messaging program (AIM by AOL or MSN Instant Messenger by Microsoft Corporation or any caller ID modification site). Here, an option may be provided to configure telephone contacts. A resulting interface may be similar to that of calling party's contacts. This may also include a palette of ring tones, images, music and other options from which the calling party may choose. The modified information may be passed to storage 250 of the calling and called parties for future reference.

Once an identification selection to identify the calling party is made, the transmission process to transmit this information to the called party can begin. This process is described below with respect to FIG. 4.

Identifier Selection and Transmission Process

Figure 4:
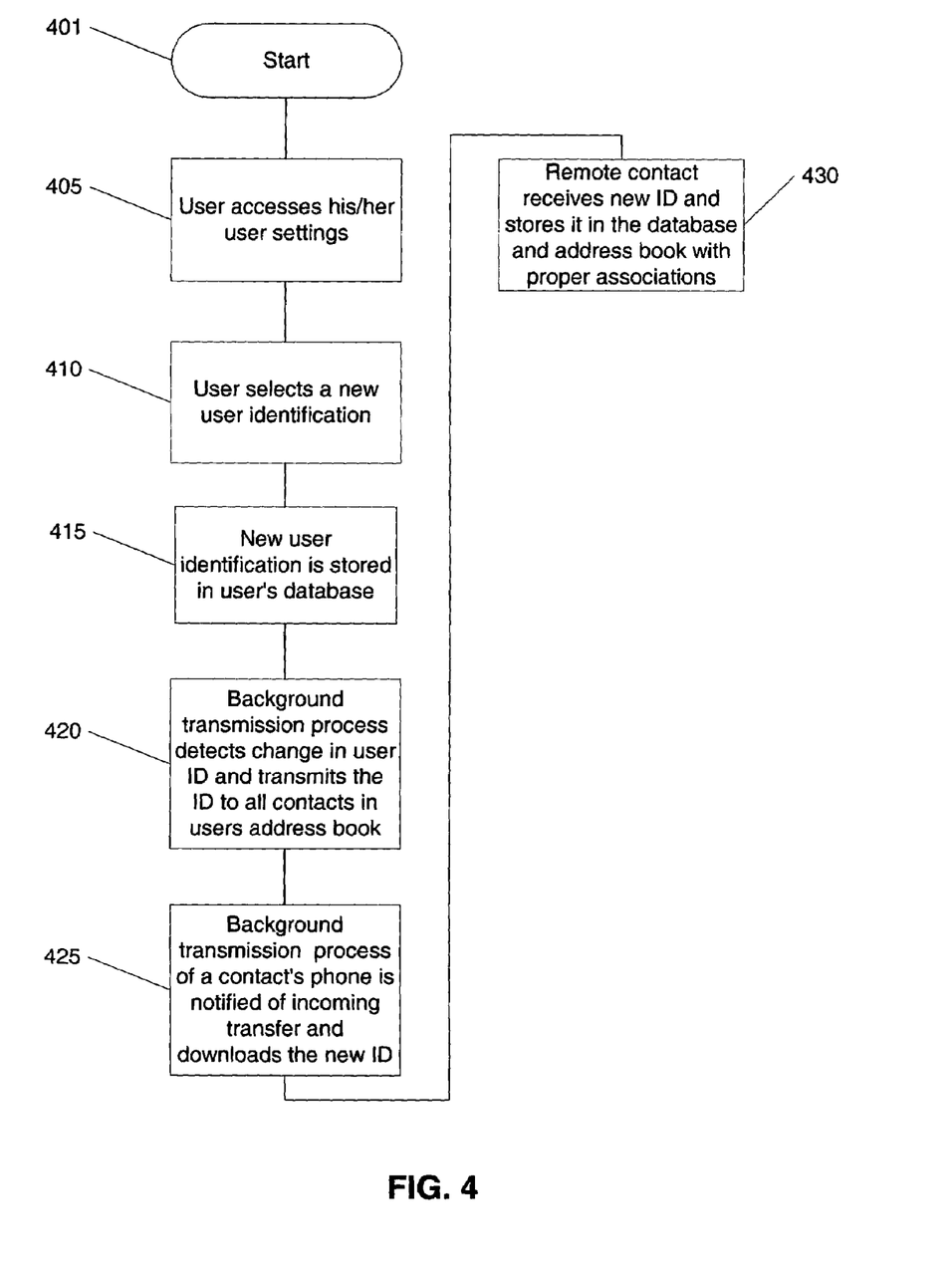
FIG. 4 illustrates a block diagram for selecting and transmitting user identifiers according to embodiments of the invention.

FIG. 4 illustrates a block diagram for selecting and transmitting user identifiers according to one embodiment of the invention. The process begins in step 401. In step 405, the user may start the process by accessing the settings mode on the telephone or other communications system (for instance, a PDA or computer connected to a cellular network and/or internet). The user may then select the feature that allows him or her to change a particular identifier associated with his or her phone number or identity. For example, a user using a mobile phone may access the phone settings option on the mobile phone and choose to change his or her identifying image. In step 410, the user may then proceed to select a new identification. Thus, for example, a user could change the image associated with his or her identity from a first image to a second image (e.g., from a panda to a shark). The user could select the new identifier in a plurality of ways ranging from selecting an identifier already in his or her database to downloading a new one from a network like the internet to drawing or making his or her own picture representation.

In step 415, after the user has finished selecting a new identifier, the new identifier is stored in at least one of a plurality of databases. The database may be internal within the communications client or it may be a remote storage facility. In one arrangement of the invention, a mobile phone user's identifier could be saved in a central network database that maintains all association tables 330 (FIG. 3) and contact databases 305 (FIG. 3). When receiving a new identifier, the database may automatically trigger a background transmission process that sends the new identifier to at least one of the applicable contacts as is described in step 420. The background transmission process may also be triggered manually, permitting the user to control when to send new information out to a contact list. The applicable contacts could be everyone within a user's contact database 305 (FIG. 3) or only certain set of selected users. The applicable list of contacts may also be formulated according to those contacts who may want to allow self-selection of identifiers versus those contacts who may wish to override such functionality.

After sending the transmission through a communications network 215 (FIG. 2), the contact's database may be alerted to incoming data as in step 425. Such a notification may serve to initiate the contact's background transmission process to download the incoming data. Notification or alerts may occur in several ways including sending a header message to provide indication of a background process data stream. Other methods include having the background transmission process ping a queue to see if any new messages or data has arrived for the contact. One advantage of using a background process may be that the user does not have to update each individual contact when he or she calls the person. Instead, the transmission of the update is performed before communications are ever established. Another advantage of such an implementation may be that the background process may take advantage of periods of low network activity and therefore efficiently utilize communications bandwidth. Additionally, those users who are comfortable with just the superficial functionality of communications systems may be confused with transmission processes occurring in the foreground. Therefore, with a transparent transmission system, communications may be user-friendly and confusion-free.

Finally in step 430, after being notified of an incoming transmission, the background process on the contact's side may download the new data and store it into its database. Again, the database may be an internal storage facility or a storage area on a remote server or communications system. The database may store the new information in the contact database and maintain the proper associations. Therefore, the contact database may automatically update with the newly acquired identifiers in the appropriate fields.

Other Aspects

Figure 5:
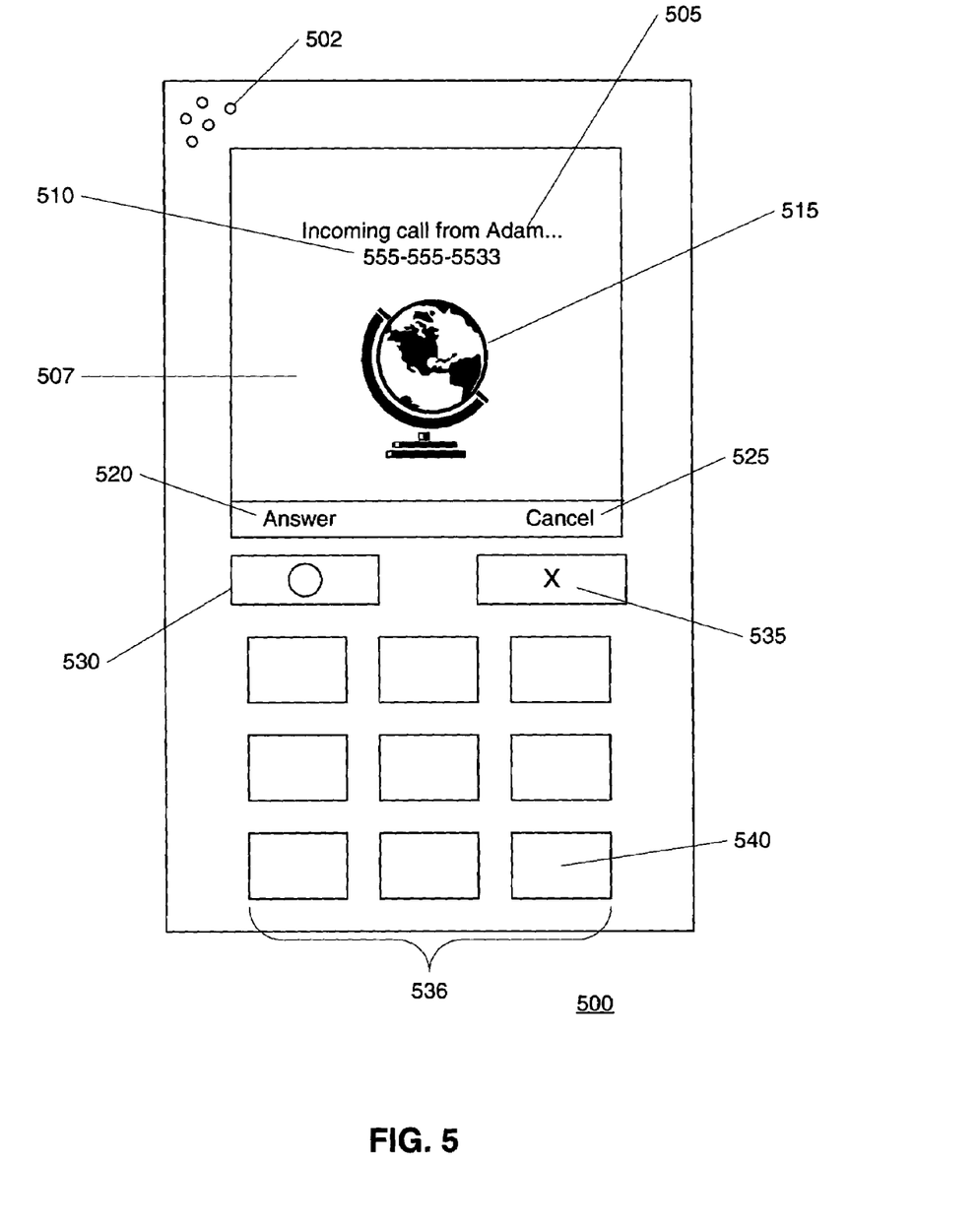
FIG. 5 illustrates a mobile phone interface according to embodiments of the invention.

FIG. 5 illustrates a mobile phone or personal data assistant voice interface according to one embodiment of the invention. The invention may be applied to mobile phone uses in order to identify callers before initiating a telephone conversation. A mobile phone 500 comprises a display screen 507, a plurality of command buttons 530 and 535, one or more speakers 502, and an alphanumeric keypad 536. A mobile phone 500 may comprise other components not shown such as a joystick maneuvering device, a camera for taking video or images and a stylus for writing directly on the display screen 507. The phone screen 507 may display, among other things, text 505 and 510, images 515 and video (not shown). Therefore, all information relevant to a call may be displayed before, during and after the call. Some examples of information that could be displayed are the name of the caller 505, the telephone number of the incoming call 510 and an image associated with the identity of the caller 515. All three examples may be classified as identifiers for the calling party. For example, if the calling party's name is Adam, the phone or caller ID display 507 may indicate the caller's name 505. The screen 507 could further display Adam's phone number 510 from which he is calling as well as the image 515 associated with his identity. One of the primary purposes of the display screen may be to show the identifying information of the caller before the called party initiates the conversation. Therefore, immediacy may also be a concern when dealing with caller ID technology. The invention addresses this concern by providing the identifiers immediately to the called party when a call is received. In one embodiment of the invention, the image 515 and name 505 may be chosen by the calling party. Therefore, Adam may, for example, decide to display his name as "Juan" or "David" instead. Furthermore, Adam may change the image of the globe 515 associated with his identity to another picture such as an image of a lion. Because the new images and name may be sent before a user makes a call, there is no need to answer the call first and wait for the data to transmit in the meantime.

Command buttons 530 and 535 allow the called party to either answer the communication or ignore it. This ability goes back to the core functionality of caller ID and that is to allow the user the flexibility of screening certain calls and answering others. For example, the screen 507 shows that Adam is calling from 555-555-5533. If the called party decides to answer the call, the user may press the button 530 located beneath the "Answer" text 520. If, however, the user decides against speaking with Adam, the user may press the "X" button 535 located beneath the "Cancel" text 525. This user flexibility is possible partially because the calling party's information is displayed immediately.

In addition to images, text and video, user identifiers may also be manifested in sounds like ring tones or sound effects. Because users may not be constantly looking at the screen of their phone, an identifying ring tone or sound effect may be an advantage in many situations. With continued reference to FIG. 5, the embodiment of the invention also comprises a speaker 502. Therefore, ring tones and sound effects may be selected as identifiers and transmitted through the background transmission process. Due to the inherent risk of permitting a vulgar sound effect or distasteful video or image to be selected and display on a called party's screen by the calling party, an override function may be implemented to disable the self-selection ability.

While caller ID technology has been primarily implemented in telephone and mobile phone systems, there may also be significant applications to computer networks and systems. Further, it may be used with home entertainment systems and entertainment-enabled home computers (for instance, the Media Center PC with software from Microsoft Corporation of Redmond, Wash., and home entertainment recording/playback systems including Ultimate TV and TiVo, as examples). Technology currently exists that allows callers to use their computers for voice communications. Such technology has become popularly known as voice over IP. With the advent of such an implementation of voice communications, caller ID would also become advantageous in the computer arena. Those using IP for telecommunications could also use an embodiment of this invention to individualize their identities and screen calls immediately upon receiving a call.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. A method of obtaining and resolving caller identification in a communications system, comprising the steps of:
   selecting, by a first user, a caller identification associated with an identity of the first user;
   transmitting, before initiating communication with a second user, the caller identification to at least one contact from a list of contacts selected from the first user's contact database through a background transmission process; and
   associating the first user's selected caller identification in the second user's communications database with the first user.

2. The method of claim 1, wherein the step of selecting, by a first user, said caller identification associated with the first user's identity further comprises: browsing a plurality of predefined identifiers stored in the first user's database.

3. The method of claim 1, wherein the step of selecting, by a first user, said caller identification associated with the first user's identity further comprises: browsing and downloading identifiers from a remote storage facility or network.

4. The method of claim 1, wherein the step of selecting, by a first user, said caller identification associated with the first user's identity further comprises: creating the first user's own identifier.

5. The method of claim 1, wherein the step of selecting, by a first user, said caller identification associated with the first user's identity further comprises: storing the selected caller identification in a storage relating to said first user.

6. The method of claim 1, wherein the step of associating the first user's selected caller identification in a second user's communications database with the first user further comprises:
   detecting an event associated with the first user's selected caller identification.

7. The method of claim 1, wherein the step of associating the first user's selected caller identification in a second user's communications database with the first user further comprises:
   detecting a type of identifier corresponding to the type of the first user's selected caller identification.

8. The method of claim 1, wherein the step of associating the first user's selected caller identification in a second user's communications database with the first user further comprises:
   storing the first user's identification in the second user's database in an association table according to an event and/or type of identifier.

9. The method of claim 1, wherein the step of associating the new identification in a second user's communications database with the first user further comprises:
   overriding, upon the second user selecting an option, the first user's self-chosen identifying information for the second user's choice of identifying information for the first user.

10. The method of claim 1, wherein the first user's identification may be a sound.

11. The method of claim 1, wherein the first user's identification includes speech.

12. The method of claim 1, wherein the first user's identification includes music.

13. The method of claim 1, wherein the first user's identification may be a ring tone.

14. The method of claim 1, wherein the first user's identification may be an image.

15. The method of claim 1, wherein the first user's identification may be a video.

16. The method of claim 1, wherein the first user's identification may be a animation.

17. A computer-readable medium having computer-executable instructions for performing a method for obtaining and resolving caller identification in a communications system, the method comprising:
   selecting, by a first user, a caller identification associated with the first user's identity;
   transmitting, before initiating communication with a second user, the first user's selected caller identification to a list of contacts selected from the first user's contact database through a background transmission process; and
   associating the new identification in the second user's communications database with the first user.

18. The computer-readable medium according to claim 17, wherein the computer-executable instructions for performing the step of selecting, by a first user, said caller identification associated with the first user's identity further comprises:
   browsing a plurality of predefined identifiers stored in the first user's database.

19. The computer-readable medium according to claim 17, wherein the computer-executable instructions for performing the step of selecting, by a first user, said caller identification associated with the first user's identity further comprises:
   browsing and downloading identifiers from a remote storage facility or network.

20. The computer-readable medium according to claim 17, wherein the computer-executable instructions for performing the step of selecting, by a first user, said caller identification associated with the first user's identity further comprises:
   creating the first user's own identifier.

21. The computer-readable medium according to claim 17, wherein the computer-executable instructions for performing the step of selecting, by a first user, said caller identification associated with the first user's identity further comprises:
   storing the selected caller identification in the first user's storage facility.

22. The computer-readable medium according to claim 17, wherein the computer-executable instructions for performing the step of associating the first user's selected caller identification in a second user's communications database with the first user further comprises:
   detecting an event associated with the first user's identification.

23. The computer-readable medium according to claim 17, wherein the computer-executable instructions for performing the step of associating the first user's selected caller identification in a second user's communications database with the first user further comprises:
   detecting a type of identifier corresponding to the type of the first user's selected caller identification.

24. The computer-readable medium according to claim 17, wherein the computer-executable instructions for performing the step of associating the first user's selected caller identification in a second user's communications database with the first user further comprises:
   storing the first user's identification in the second user's database in an association table according to event and/or type of identifier.

25. The computer-readable medium according to claim 17, wherein the computer-executable instructions for performing the step of associating the first user's selected caller identification in a second user's communications database with the first user further comprises:
   overriding, upon the second user selecting an option, the first user's self-chosen identifying information for the second user's choice of identifying information for the first user.

26. The computer-readable medium according to claim 17, wherein the first user's identification may be a sound.

27. The computer-readable medium of claim 17, wherein the first user's identification includes speech.

28. The computer-readable medium of claim 17, wherein the first user's identification includes music.

29. The computer-readable medium according to claim 17, wherein the first user's identification may be a ring tone.

30. The computer-readable medium according to claim 17, wherein the first user's identification may be an image.

31. The computer-readable medium according to claim 17, wherein the first user's identification may be a video.

32. The computer-readable medium of claim 17, wherein the first user's identification may be an animation.

33. A mobile terminal, comprising:
   a display screen;
   an input system for receiving user input;
   a wireless communications subsystem;
   a processor;
   memory storing computer executable instructions that, when executed by the processor, cause the mobile terminal to perform a method for obtaining and resolving caller identification, comprising the steps of:
      (i) selecting, by a first user, a caller identification associated with the first user's identity;
      (ii) transmitting, before initiating communication with a second user, through a background process, the caller identification to a list of contacts selected from the first user's contact database database through a background transmission process; and
      (iii) associating the new identification in the second user's communications database with the first user.

34. In a computer system, a communications and caller identification processing system comprising:
   a processor; and
   a memory for storing computer readable instructions that, when executed by said processor, cause the computer to perform the steps of:
   selecting, by a first user, a caller identification associated with the first user's identity;
   transmitting, before initiating communication with a second user, through a background process, the caller identification to a list of contacts selected from the first user's contact database through a background transmission process; and
   associating the new identification in the second user's communications database with the first user.

* * * * *